Figure 1:
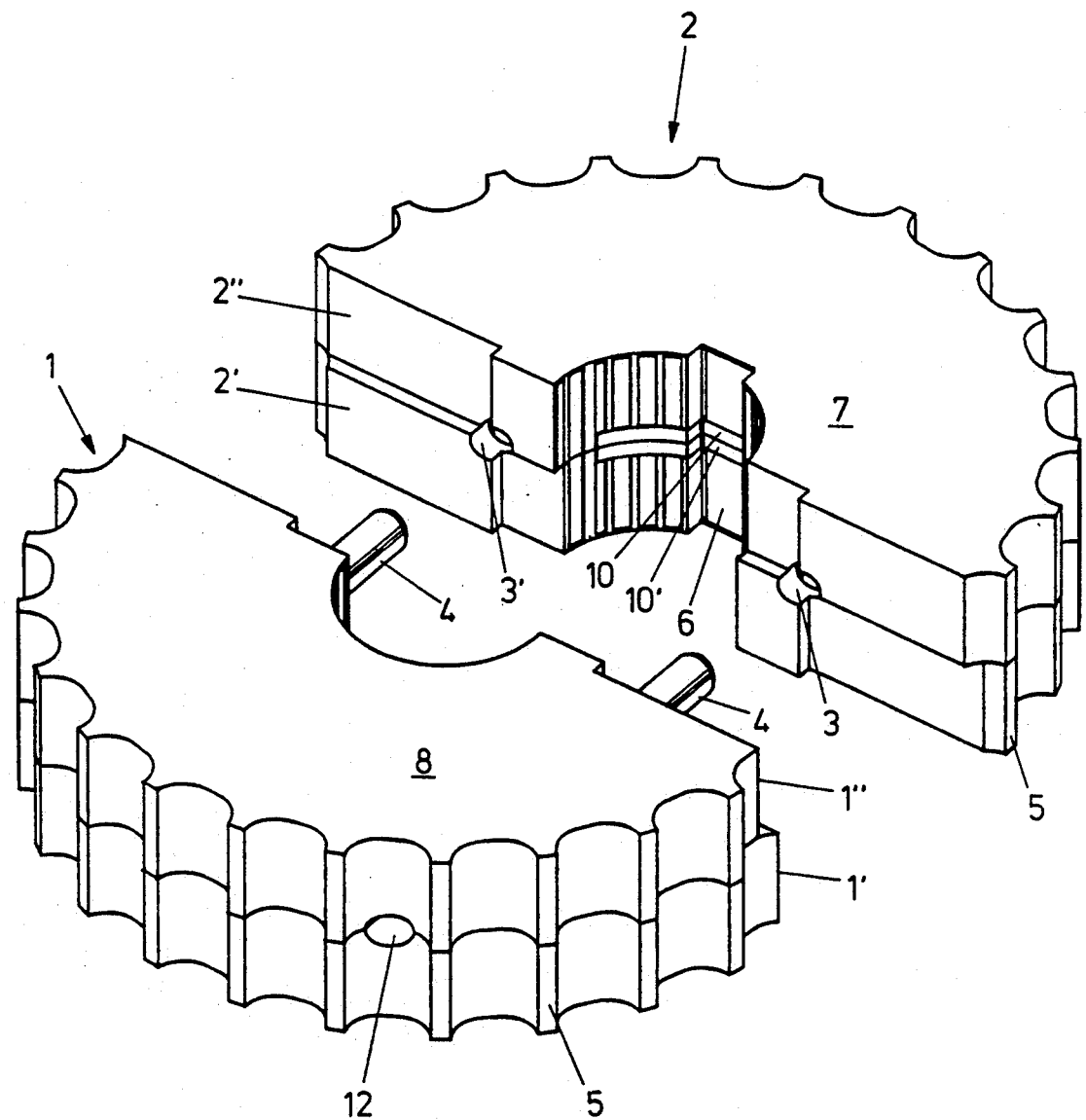

United States Patent [19]

Bos et al.

[11] Patent Number: 5,322,478
[45] Date of Patent: Jun. 21, 1994

[54] DIVISIBLE SPROCKET WHEEL

[75] Inventors: Arnoldus J. L. Bos, -Gravenzande; Constantinus P. J. M. Vermeulen, Rotterdam, both of Netherlands

[73] Assignee: MCC Nederland B.V., The Hague, Netherlands

[21] Appl. No.: 33,018

[22] Filed: Mar. 18, 1993

[30] Foreign Application Priority Data

Mar. 20, 1992 [NL] Netherlands ......................... 9200519

[51] Int. Cl.$^5$ ............................................. F16H 55/46
[52] U.S. Cl. ......................................... 474/95; 474/96
[58] Field of Search .................................. 474/95-99

[56] References Cited

U.S. PATENT DOCUMENTS

| 4,964,842 | 10/1990 | Howard | 474/96 X |
| 5,037,356 | 8/1991 | Gladczak et al. | 474/95 |
| 5,057,058 | 10/1991 | Crudup | 474/95 |

FOREIGN PATENT DOCUMENTS 2370203 11/1976 France .
8501246 12/1986 Netherlands .

Primary Examiner—Thuy M. Bui
Attorney, Agent, or Firm—Morgan & Finnegan

[57] ABSTRACT

Sprocket wheels for use in chain conveyors, for instance, are preferably of a divisible construction so as to enable each wheel to be removed from the shaft separately. Also, on the basis of considerations of hygiene, the outer side surface of such a wheel is preferably entirely flat when used in the food or beverage industry. Existing divisible wheels are either flat on the outside, but expensive, or not flat and cheap because they are made by injection molding. The synthetic sprocket wheel according to the invention is flat and cheap and comprises two wheel halves with axial planes abutting against each other, each wheel half consisting of two interconnected parts, made by injection molding, abutting against each other through a radial side face, with the cavities and ribs necessarily present for the injection molding process being located in the interior of the wheel half.

4 Claims, 2 Drawing Sheets

DIVISIBLE SPROCKET WHEEL

The present invention relates to a divisible sprocket wheel, made from synthetic material, comprising two wheel halves with axial planes abutting against each other and means for interconnecting the wheel halves.

Such a sprocket wheel is disclosed in, for instance, U.S. Pat. No. 5,037,356 and has as an advantage that in the case where several sprocket wheels are present side by side on a shaft, as in chain conveyors, replacement of one of the sprocket wheels can take place without the necessity of first removing all or at least a number of the wheels from the shaft and without the necessity of removing the wheel-carrying shaft from its bearings. However, the side faces of the known sprocket wheel have a highly irregular shape, on the one hand because thickened portions have been formed in the side faces, provided with openings for receiving fastening elements for coupling the two wheel halves, and, on the other hand, because the width of the teeth of the toothed rim of the sprocket wheel is considerably smaller than the part of the sprocket wheel that embraces the shaft. Consequently, the known sprocket wheel has the drawback that the irregularly shaped openings and slots present in the side faces easily take up dirt. Particularly in recent years, this has increasingly been considered a problem because the dirt caked to the sprocket wheel is difficult to remove and prevents hygienic production. Particularly now that efforts are being made nowadays to employ fewer and fewer preservatives in the production of food, it is of course desirable to aim for optimum hygiene in the conveying lines for such products, which is not possible if the sprocket wheels used in a conveying line or packaging-/filling line can easily become dirty and are difficult to clean. It is true that there are divisible sprocket wheels of which the two wheel halves are made from a solid block of material by means of a material removing operation and of which the side faces are smooth. It is true that such sprocket wheels, made from solid material through a removing operation, are easy to clean, but they have the drawback that they have a high cost price due to the labour involved in the production thereof and the large amount of material required. Such a sprocket wheel, moreover comprising a separate, entirely metal square hub piece, is disclosed in Dutch patent application 8501246.

The object of the present invention is to provide a divisible sprocket wheel, which is, on the one hand, cheap to manufacture and, on the other hand, insensitive to fouling and also easy to clean.

To that end, the invention provides a sprocket wheel of the type mentioned hereinabove, characterized in that each wheel half consists of two interconnected parts, made by means of injection molding, abutting against each other through a radial side face, with the cavities and ribs as determined by the injection molding process being located in the interior of the wheel half, and both wheel halves having the same, essentially constant width in axial direction and having radial outer side faces which are essentially flat.

Figure 2:
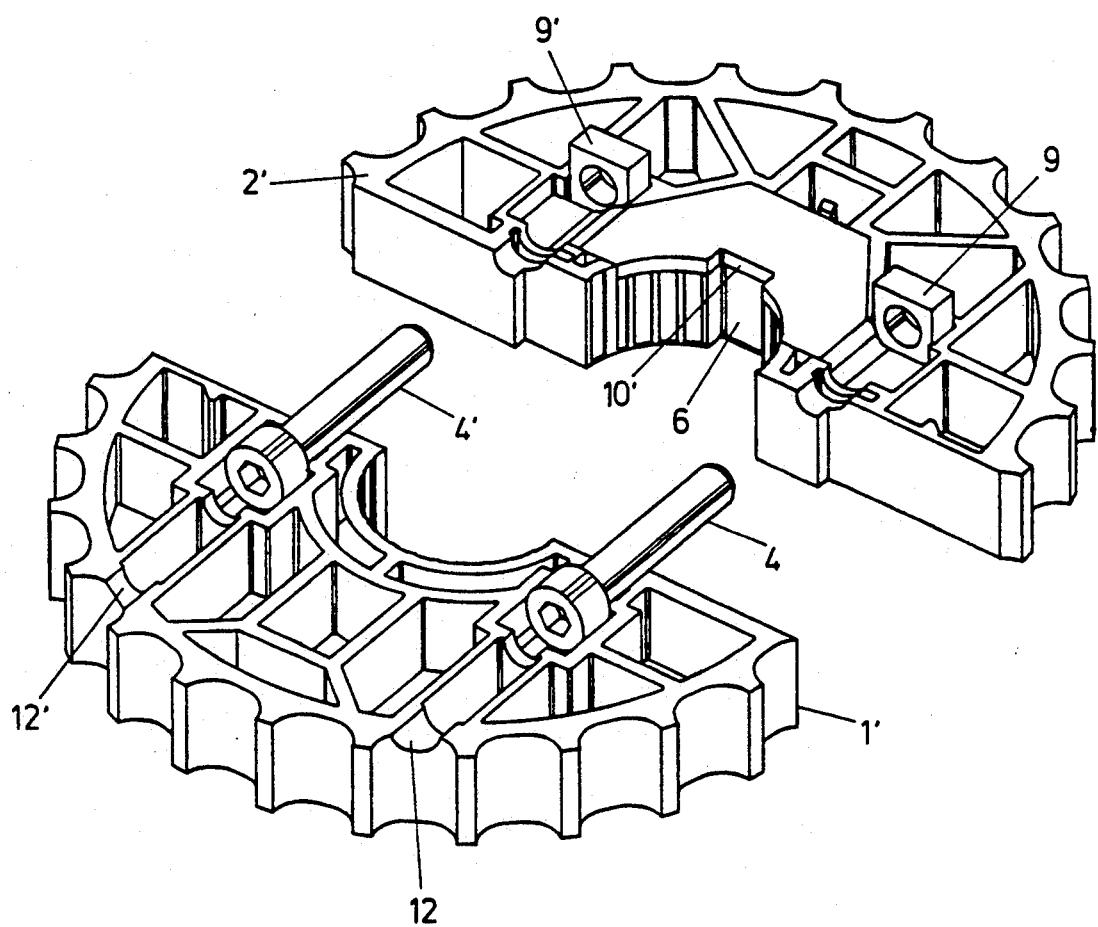

One embodiment of the invention will be described hereinafter, by way of example only, with reference to the accompanying drawings, in which:

FIG. 1 is a perspective view of the two wheel halves of the sprocket wheel according to the invention; and FIG. 2 is a perspective view of two wheel half parts.

The drawings show a first wheel half indicated as a whole by reference numeral 1 and a second wheel half indicated as a whole by reference numeral 2. Each wheel half is essentially hollow and consists in itself of two further wheel half parts, 1', 1" and 2', 2" respectively, separated by a radial centre plane. The wheel half parts 1', 1" 2', and 2" are manufactured in a manner known per se by an injection molding process in a mold suitable for that purpose. In this process, the two wheel half parts, together constituting one wheel half, can in principle be manufactured with the same mold in successive injection molding steps. For instance, a mold can be made such that it is suitable for making a wheel half part 1' and a wheel half part 2' at the same time in one injection molding step. Due to the fact that the ribs and cavities, characteristic of the injection molding process and clearly visible in FIG. 2, of two wheel half parts, such as 1' and 1" or 2' and 2", face each other when the wheel halves are interconnected, a wheel half 1 or 2 is formed having radial side faces, such as 7 and 8, that are essentially completely smooth and hence difficult to foul and, if necessary, easy to clean properly.

A further advantage of the sprocket wheel according to the invention is that the means for interconnecting the axial surfaces of wheel halves 1 and 2, when these are placed on a shaft (not shown), can also be concealed entirely in the wheel half parts. For instance, according to the practical example shown, two nuts 9, 9' are accommodated and locked in wheel half parts 2 and 2' and openings providing access to these nuts are formed in the axial side face of wheel half 2, while bolts 4, 4' are accommodated in recesses suitable therefor in the axial side face of wheel half 1. To enable bolts 4, 4' to be tightened, a through opening 12, 12' is provided for each bolt in wheel half 1. The through openings 12, 12' extend substantially perpendicularly to the axial side face and terminate in the surface of the toothed rim 5. Through the openings 12, 12', the relevant bolt can be tightened by means of a tool suitable for that purpose. After wheel halves 1 and 2 have been connected to each other so as to surround a shaft, these openings can optionally be closed by a cap or the like.

To enable the sprocket wheel, after it has been mounted, to be locked against rotation relative to a shaft as well, one of the two wheel halves, such as 1, preferably comprises a key slot 6 for receiving a key present on the shaft. To prevent damage to the key slot due to the relatively great forces exerted thereon, preferably a stiffening element is accommodated in key slot 6, for instance a metal plate comprising two plate parts 10, 10'.

Wheel half parts 1' and 1", and 2' and 2", respectively, can be joined together in various manners, for instance by means of glueing or welding, or a clicking or clamping connection suitable for that purpose. Glueing or welding has the advantage that the sprocket wheel can be rendered entirely waterproof.

It is further observed that, although wheel halves 1 and 2 are divided into two wheel half parts preferably along their radial centre planes, this is not required. In principle, the parting line can also be staggered in either direction relatively to the middle or may even be provided so as to be staggered along the circumference of a wheel half. It is also observed that, although in the drawings the wheel halves, in circumferential direction, are essentially shaped as semicircles, this is not required. In principle, the wheel halves can be complementarily shaped in any desired manner such that together they constitute a sprocket wheel, although various preconditions, prescribed by the use of the wheel, must of course be taken into account here. Finally, the axial planes of the wheel halves, as shown in the practical example, can be stepped, which simplifies the positioning of the wheel halves relatively to each other, but these axial planes can also be entirely flat.

After the wheel halve parts have been joined together, the fastening elements present therein, such as 4 and 9, and the stiffening elements present therein, such as 10, 10', are inseparably connected to the respective wheel half, which constitutes a further advantage, because these elements are thereby prevented from getting lost, as happened quite often to the known sprocket wheels.

We claim:

1. A divisible sprocket wheel, made from synthetic material, comprising two wheel halves with axial planes abutting against each other and means for interconnecting the wheel halves, consisting of two interconnected parts made from synthetic material, each part made by means of injection molding and comprising a radial inner side face, a radial outer side face and a circumferential face, the two parts of said wheel half abutting against each other through their radial inner side faces, each part further comprising cavities and ribs as determined by the injection molding process extending at least in part from the inner side face to the outer side face from each part, these cavities and ribs being located inside said wheel half when the two parts that form said wheel half are abutting, said wheel half having a radial outer side face which is essentially flat.

2. A divisible sprocket wheel according to claim 1, characterized in that both wheel half parts have an equal width in axial direction.

3. A divisible sprocket wheel according to claim 1 or 2, characterized in that the two wheel half parts are interconnected by means of glueing or welding.

4. A wheel half for a divisible sprocket wheel, made from synthetic material comprising two wheel halves, said wheel half consisting of two interconnected parts made from synthetic material each part made by means of injection molding and comprising a radial inner side face, a radial outer side face and a circumferential face the two parts of said wheel half abutting against each other through their radial inner side faces, each part further comprising cavities and ribs as determined by the injection molding process extending at least in part from the inner side face to the outer side face from each part, these cavities and ribs being located inside said wheel half when the two parts that form said wheel half are abutting, said wheel half having a radial outer side face which is essentially flat.

* * * * *